US008240272B2

(12) United States Patent
Duke (10) Patent No.: US 8,240,272 B2
(45) Date of Patent: Aug. 14, 2012

(54) MILKING EQUIPMENT

(75) Inventor: James Richard John Duke, Chichester (GB)

(73) Assignee: An Udder IP Company Ltd., West Sussex (GB)

( * ) Notice: Subject to any disclaimer, the term of this patent is extended or adjusted under 35 U.S.C. 154(b) by 2 days.

(21) Appl. No.: 11/568,171

(22) PCT Filed: Apr. 22, 2005

(86) PCT No.: PCT/GB2005/001533
§ 371 (c)(1),
(2), (4) Date: Oct. 20, 2006

(87) PCT Pub. No.: WO2005/102035
PCT Pub. Date: Nov. 3, 2005

(65) Prior Publication Data
US 2007/0215053 A1    Sep. 20, 2007

(30) Foreign Application Priority Data
Apr. 22, 2004 (GB) .................................. 0408968.6

(51) Int. Cl.
*A01J 5/04* (2006.01)
*A01J 5/16* (2006.01)
*A01J 7/02* (2006.01)
(52) U.S. Cl. ................ 119/14.37; 119/14.02; 119/14.18
(58) Field of Classification Search ............... 119/14.01, 119/14.02, 14.08, 14.18, 14.37, 14.38, 14.39
See application file for complete search history.

(56) References Cited

U.S. PATENT DOCUMENTS

| 3,482,547 | A |   | 12/1969 | Maier |
| 3,630,081 | A | * | 12/1971 | Nelson ............................ 73/219 |
| 3,726,253 | A | * | 4/1973 | Duncan ....................... 119/14.18 |
| 3,762,371 | A | * | 10/1973 | Quayle et al. .............. 119/14.14 |
| 3,789,798 | A | * | 2/1974 | Reisgies et al. ............ 119/14.08 |

(Continued)

FOREIGN PATENT DOCUMENTS
DD           261300        10/1988
(Continued)

OTHER PUBLICATIONS

Feb. 22, 2006 correspondence to International Preliminary Examining Authority regarding corresponding International Application No. PCT/GB2005/001533—includes amendments to specification and claims.

(Continued)

*Primary Examiner* — David J Parsley
(74) *Attorney, Agent, or Firm* — Alston & Bird LLP (57) ABSTRACT

In a milking cluster of teat cups, each teat cup has a port in the form of a nozzle disposed in the head portion of the flexible liner (3) of the teat cup. The milking cluster includes a distributor having a fluid inlet aid outlets connected to the nozzles of the cups. The distributor inlet is connected to a supply of filtered air under atmospheric pressure by a first valve which is operable to admit air to the distributor in order to regulate the level of vacuum present in the teat cup liners during a milking cycle. It is connected to a delivery line for supplying sanitising fluid, which is utilised to treat the teats and teat cups in a cleansing cycle following the milking cycle, by a second valve operable to maintain the delivery line primed with sanitising fluid preparatory to initiation of the cleansing cycle.

13 Claims, 6 Drawing Sheets

U.S. PATENT DOCUMENTS

| | | | |
|---|---|---|---|
| 4,175,514 A | 11/1979 | Souza et al. | |
| 4,516,530 A * | 5/1985 | Reisgies et al. | 119/14.08 |
| 4,572,105 A * | 2/1986 | Chowdhury et al. | 119/14.18 |
| 4,593,649 A * | 6/1986 | Britten | 119/14.08 |
| 4,924,809 A * | 5/1990 | Verbrugge | 119/14.02 |
| 5,161,482 A * | 11/1992 | Griffin | 119/14.02 |
| 5,178,095 A * | 1/1993 | Mein | 119/14.47 |
| 5,386,799 A * | 2/1995 | Dietrich | 119/14.51 |
| 5,881,669 A * | 3/1999 | van den Berg et al. | 119/14.03 |
| 5,992,347 A | 11/1999 | Innings et al. | |
| 6,089,242 A * | 7/2000 | Buck | 134/57 R |
| 6,267,077 B1 * | 7/2001 | van den Berg et al. | 119/14.01 |
| 6,308,655 B1 * | 10/2001 | Oosterling | 119/14.08 |
| 6,561,126 B2 * | 5/2003 | Forsen et al. | 119/14.02 |
| 6,619,227 B1 * | 9/2003 | Berger et al. | 119/14.08 |

FOREIGN PATENT DOCUMENTS

| | | |
|---|---|---|
| EP | 0 277 396 | 8/1988 |
| EP | 0 459 817 | 12/1991 |
| EP | 0543463 | 5/1993 |
| EP | 0 945 057 | 9/1999 |
| GB | 1 440 901 | 6/1976 |
| WO | WO 01/17338 | 3/2001 |
| WO | WO 02/23976 | 3/2002 |
| WO | WO 2005/022986 | 3/2005 |
| WO | WO 2005/043986 | 5/2005 |
| WO | WO 2005/072516 | 8/2005 |

OTHER PUBLICATIONS international Preliminary Report on Patentability issued in corresponding International Application dated May 12, 2006.

Jun. 21, 2006 correspondence to International Preliminary Examining Authority regarding International Preliminary Report on Patentability issued in corresponding International Application.

Communication issued in corresponding International Application dated Jul. 6, 2006.

Jul. 26, 2006 correspondence to International Preliminary Examining Authority regarding Communication issued in corresponding International Application.

Communication issued in corresponding International Application dated Aug. 18, 2006.

Written Opinion of the International Preliminary Examining Authority issued in corresponding International Application dated Aug. 21, 2006.

Aug. 29, 2006 Response to Written Opinion in corresponding International Application.

International Preliminary Report on Patentability for International Application No. PCT/GB2005/001533 completed Sep. 14, 2006.

International Search Report for International Application No. PCT/GB2005/001533 completed Oct. 3, 2005.

Grindal, R. J. et al., *Automatic Application of Teat Disinfectant Through the Milking Machine Cluster*, Journal of Dairy Research, 56, 1989, pp. 579-585.

Akam, D. N., *The Development of Equipment for the Mechanization of Manual Operations in Machine Milking*, Proceedings of the International Symposium on Machine Milking, 17th Annual Meeting National Mastitis Council, Inc., Feb. 1978, pp. 417-426.

P.D. Thompson, et al.; *The End-of Milking Sequence and Its Mechanization*; ASAE; 1976 Winter Meeting of the American Society of Agricultural Engineers; Dec. 14-17, 1976; pp. 1-15.

Communication issued in corresponding European Application No. 05736061.2.

\* cited by examiner

MILKING EQUIPMENT

The present invention relates to milking equipment and, more particularly, to devices and methods for improving control of the milking cycle and the disinfecting and cleaning of teats and teat cups post milking.

Conventionally, milking equipment installed in a milking parlor comprises a milking point at each animal stall within the parlor. Each milking point includes a milking cluster of teat cups for connecting the equipment to the teats of an animal to be milked. In the case of cows, for example, each milking cluster has four teat cups. Each teat cup comprises a hollow shell supporting a flexible liner which has a barrel portion for engaging about a teat and, at its upper end, has a head portion with a mouth through which the teat is engaged with the barrel of the liner. At the opposite, discharge end of the teat cup, the liner communicates with a flexible, short milk tube connected to a, so called, clawpiece of the cluster where the milk extracted from the animals teats is collected and delivered, via a is flexible, long milk tube, to the collection vessel of the equipment.

Upon commencement of milking, a vacuum is applied to the teat cups, via the long milk tube, the clawpiece and the short milk tubes, for the purposes of extracting milk from the teat cups. This vacuum also leaks between the barrel of the liner and the engaged teat and is applied to a void formed about the teat in the head of the liner in order to capture the cup on the teat. Milking is achieved by automatically and alternately applying vacuum and atmospheric pressure pulses to the space between the shell and the liner of each teat cup in order to flex the liner and stimulate discharge of milk from the engaged teat. It is customary to apply these pneumatic pulses alternately to pairs of teat cups of a cluster. The clawpiece-includes a distributor for distributing the pneumatic pulses to the individual teat cups, via flexible pneumatic lines or tubes.

After completion of a milking cycle, the milking cluster at each milking point is withdrawn from the teats (commonly referred to as "take-off") such as by an automatic cluster remover and, in a cleansing cycle, the teat cups are flushed internally with disinfectant and water and are dried with compressed air. The teat cups may be fitted with injection nozzles for injecting treatment fluids into the heads of the liners, as described in my copending international application PCT/GB2004/004343, Publication No. WO-A-2005043986. The treatment fluid is fed to the injection nozzles via a distributor of the clawpiece. Alternatively, or in addition, treatment fluids may be supplied to each teat cup via a flush valve connecting the short milk tube to the discharge end of the teat cup. In either event, upon take-off, the milking cluster is designed to enable the short milk tubes to fall away from the centreline of the cluster so that the teat cups are inverted and hang with their heads downwardly from the clawpiece in a rest position. Flushing may be performed with the teat cups in this rest position. Consequently liquid can escape through the head portions of the teat cups. However, where the teats and teat cups are treated with disinfectant fluid and the teat cups are rinsed, there is a risk that the fluids used may contaminate the harvested milk if they are not physically prevented from entering the short milk tube. My copending international application No PCT/GB2005/000310, Publication No. WO-A-2005072516, describes a shut-off valve device for preventing entry of treatment fluid into the milk tubes and consequent contamination of the harvested milk when, subsequent to milking, treatment fluid is injected into a teat cup to cleanse the cup and teat of an animal and/or to back flush the teat cup.

EP-A-0945057 describes a teat cup which is provided with a cleaning and/or disinfecting device comprising three spraying elements disposed about the upper edge of the teat cup so as to spray fluid obliquely upwards. Before the teat cup is connected automatically to a teat of an animal to be milked, it is positioned under the teat and cleaning fluid is sprayed against the teat by the spraying elements. After the teat has been cleaned, the teat cup is automatically connected to the teat, whereupon milking is started. After the udder quarter of which the teat constitutes part has been milked out, the teat cup is automatically withdrawn and at the same time disinfecting fluid is sprayed against the teat by means of the spraying elements.

Where injection nozzles are used for injecting treatment fluid into the heads of the liners, post-milking, as described in WO-A-2005043986, there is a risk that the treatment fluid may not be supplied in a timely manner to the teat cups and that the charge of air purged from the delivery lines into the teat cups ahead of the treatment fluid may blow the teat cups off the teats.

An object of the present invention is to alleviate this risk and, hence, the problems associated therewith.

From one aspect, therefore, the invention consists in a milking cluster comprising a plurality of teat cups, each of which includes a flexible liner for engaging about a teat of an animal to be milked, said liner having an head portion, at one end, provided with a mouth through which the teat is engageable with the liner, and a milk discharge passageway at the opposite end, and a clawpiece coupled to the milk discharge passageways for collecting milk from the teat cups for onward delivery, characterised by nozzle means for discharging treatment fluid into the head portions of the liners, a distributor mounted on the clawpiece for distributing treatment fluid to the nozzle means of the liners and comprising an inlet for treatment fluid and outlets connected to the nozzle means, and a valve for connecting the distributor inlet to a delivery line for treatment fluid under pressure, said valve operating to maintain the delivery line primed with treatment fluid.

From another aspect, the invention consists in a method of milking comprising the steps of applying teat cups of a milking cluster to the teats of an animal to be milked, each of the teat cups including a flexible liner engaging about a teat and having a head portion, at one end, provided with a mouth through which the teat is engaged with the liner, and a milk discharge passageway at the opposite end, activating the flexible liners to perform a milking cycle and, when the milking cycle is terminated, discharging treatment fluid into the head portions of the lines and withdrawing the teat cups from the teats, characterised by supplying treatment fluid to the milking cluster via a delivery line connected to the inlet of a distributor maintained on a clawpiece of the milking cluster, maintaining the delivery line, at least substantially to the milking cluster, primed with treatment fluid preparatory to discharge of the treatment fluid into the head portions, discharging treatment fluid fed through the distributor into the head portions of the liners, and utilising withdrawal of the teat cups to wipe the fluid down the teats.

Hence, the milking cluster may include a check or non-return valve for connecting the inlet of the distributor, via the delivery line, to a supply of treatment fluid, such as disinfectant, this valve being operable to maintain the delivery line primed with treatment fluid, under pressure. The delivery line is thus primed with treatment fluid which can be supplied in a timely manner to the teat cups, at relatively low pressure, and without being preceded by a charge of air as the latter is purged from the lines into the teat cups ahead of the treatment fluid. Apart from a more timely delivery, this also avoids the risk of the purged air blowing the teat cups off the teats.

Problems can arise during the milking cycle owing to the presence, within the liner of a teat cup, of an excessive amount of the vacuum used to withdraw, from the cup, milk discharged from the teat. This situation may arise because of the non-uniform nature of animals' teats. Precise liner selection for individual animals is impractical. Excess vacuum in the head of a liner risks the liner creeping up the animal's teat, resulting in restriction of the blood flow within the teat and consequent discomfort, poor to milk let down and physical damage to the teat. Also, where the teat cups of a cluster are fitted with injection nozzles for injecting treatment fluids into the heads of the liners, it is desirable to provide non-return valves in the treatment fluid supply lines to the injection nozzles so as to avoid cross-coupling of the vacuum occurring in the individual head portions of the teat cup liners and excess or insufficient vacuum in the head of one or more teat cups affecting the other teat cups of the cluster.

In a preferred embodiment, the teat cups are constructed as disclosed in WO-A-2005043986 and the injection nozzles and associated fluid delivery tubes for injecting disinfectant and conditioner into the heads of the liners during the cleansing cycle, which is initiated at the end of the milking cycle, are also used, for supplying air to the heads of the liners during the milking cycle, in order to control the degree of vacuum occurring within the heads. This enables the control of the vacuum occurring within the liner heads, during the milking cycle, and enables the milking cycle to be enhanced by alleviating the problems associated with excess vacuum which may occur within a liner as a result of the vacuum applied thereto for withdrawing the milk. The regulation of the vacuum present within the head of a liner enables more precise control over the milking characteristics of the teat cup.

According to a feature of the invention, therefore, the milking cluster includes a vacuum regulating valve for connecting the distributor inlet to an air supply, the vacuum regulating valve being operable to admit air to the distributor in order to regulate the level of vacuum present within one or more of the liners during a milking cycle.

In the case where the injection nozzles are also used for vacuum regulation, the invention avoids the need for non-return valves in the individual fluid supply lines connecting the distributor outlets to the nozzles, thus saving costs.

The vacuum regulating valve may be adjustable so that the vacuum can be regulated to specific levels with the aid of the valve means.

Preferably, the nozzle means are connectable with ambient air, at atmospheric pressure, via the vacuum regulating means which is adapted to open in response to the vacuum in the head of a liner exceeding a predetermined level to admit the ambient air to the liners, thereby to control the level of the vacuum present within the liner head during the milking cycle.

Conveniently, the vacuum regulating valve is a check or non-return valve which has its inlet connected to ambient atmospheric pressure and its outlet connected to the distributor inlet and which is adapted to open in response to the differential pressure between its inlet and outlet exceeding a predetermined amount.

To reduce the risk of contaminating the milk, the air supplied to the head nozzles of the liners is clean filtered air. Preferably, it is treated prior to introduction into the liner heads by filtering through a food grade filtration system to reduce the risk of contamination.

Irrespective of whether the nozzles are also used to supply air during the milking cycle in order to control vacuum within the teat cup heads, a safety valve is preferably included downstream of the delivery line check or non return valve to prevent treatment fluid entering the liner and contaminating the milk in the event of a control system malfunction. A suitable safety valve for this purpose comprises inlet and outlet ports, connectable respectively to the treatment fluid delivery line and the distributor, a drain port, a valve member which can be actuated to connect the inlet port to the drain port or the outlet port, and means for actuating the valve member. Conveniently, the latter means is pneumatically actuated.

The safety valve provides protection against manifold valve malfunction during the milking cycle and ensures that, in the event of a malfunction which causes treatment fluid, under pressure, to be fed through the delivery line non-return valve to the distributor, this is controlled by the safety valve. During the milking cycle, the safety valve is open to the drain port so that treatment fluid can flow to waste instead of risking the possibility of this treatment fluid contaminating the milk.

After completion of the milking cycle, the milking cluster at each milking point is pulled from the teats by an automatic cluster removers and the animal's teats are automatically treated with disinfectant and conditioning fluid, such as, iodine or chlorohexadine and an emollient. For example, the teats may be treated automatically with treatment fluid injected within the head of the liner of each teat cup, as described in WO-A-2005043986. After such treatment, the teat cups may be flushed or rinsed internally and dried, for example, with water and compressed air, which may also be injected into the liners through the head injection nozzles. To this end, the nozzles may be designed to produce a spray pattern which is directed towards the barrel of the liner.

Alternatively, or in addition, the teat cups may be back flushed or rinsed internally via a flush valve connecting the short milk tube to the discharge end of each teat cup. When pulled from the teats, the milking cluster is designed so as to enable the short milk tubes to fall away from the centerline of the cluster so that the teat cups hang downwardly and are inverted about the clawpiece. Consequently, liquid can escape through the heads of the teat cups. However, in both cases where the teats and teat cups are treated with disinfectant fluid and the teat cups are rinsed, there is a risk that the fluids used may contaminate the harvested milk, if they are not physically prevented from entering the short milk tube.

WO-A-2005072516, describes a shut off valve device for preventing entry of treatment fluid into the milk tubes and consequent contamination of the harvested milk, when, subsequent to milking, treatment fluid is injected into a teat cup to cleanse the cup and teat of an animal and/or to back flush the teat cup. When used with the present invention, the shut off valve device may be directly connected to the discharge end of the teat cup liner or be disposed in the short milk tube connecting the teat cup to the clawpiece. Where the shut off valve device also includes a back flush nozzle, as described in WO-A-2005072516, separate distributors mounted on the clawpiece and having flexible delivery tubes may be used for supplying treatment and rinse fluid to the heads of the teat cups and the back flush nozzles.

Each milking point in a milking parlor has a stall control unit incorporating a programmable electronic circuit board controlling solenoid valves which, in turn, selectively control the supply of treatment fluids, water, compressed air and vacuum to the milking cluster from a manifold assembly delivering these fluids to the individual milking points from common sources of supply. The programmable electronic circuit board can be programmed via a local network. The stall control unit selectively delivers the fluids to a distributor or distributors mounted on the clawpiece of the associated cluster. The distributor for the head injection nozzles distributes the fluids to the individual teat cups, each of which, in accordance with the present invention, incorporates an injection nozzle which enables the vacuum in the head of the teat cup liner to be regulated during the milking cycle and, subsequently, enables treatment fluid to be injected into the head of the liner. A shut off valve constructed in accordance with WO-A-2005072516 may be installed in each short milk tube connecting a teat cup to the clawpiece. This shut off valve incorporates a diaphragm which, when supplied with air under pressure closes and blocks the short milk tube during the cleansing cycle. It is opened again, following completion of the cleansing cycle by the application of vacuum. A nozzle may be incorporated with the shut off valve to flush clean the discharge end of the liner, and the shut off valve incorporates a bleed valve to allow liquid to drain from the liner if the associated teat cup becomes entangled and fails to invert upon take off from a teat.

According to a further aspect, the invention consists in a stall control unit comprising valves for selectively controlling the supply of fluids from a manifold assembly of the milking equipment to the teat cups of a milking cluster, whereby air, preferably at ambient pressure, is supplied to the distributor feeding the head injection nozzles of the milking cluster during the milking cycle in order to regulate the vacuum in the heads of the liners, and treatment fluid is supplied to the distributor for application to an animal's teats at completion of the milking cycle and during a cleansing cycle in order to disinfect the teats and cleanse the teat cups for the next animal. Preferably, the stall control unit also includes valve means for selectively applying compressed air or vacuum signals to control the shut off valves. The same pneumatic signals may also be supplied to the pneumatically operated safety valve, described above for controlling supply of treatment fluid to the injection nozzle in the heads of the teat cups, in order to operate the safety valve.

The invention is devised to enable users to benefit from improved animal health, efficient use of teat care products, consistent and controlled application of the milking process and significant labor savings due to reduced workload, improved animal health and increased animal throughputs in the milking parlor.

The programmable electronic circuit board in each stall control unit is designed to control the valves of the stall control unit, the timing of their actuation and, hence, the quantity of fluids supplied to the distributor of the clawpiece. The stall control unit may include means for monitoring system performance, pressure and vacuum levels and system status, etc.

At the completion of the milking cycle, a suitable control signal which may be derived from the milking equipment, for example, it can be obtained from the milk flow meter or automatic cluster remover fitted at a respective milking point, is fed to the programmable electronic circuit board. This initiates a change in pneumatic signals supplied to the shut off valves connected to the teat cups such that the vacuum signal applied to the diaphragm of each shut off valve is reversed, to an air pressure signal, thereby closing the valve. These same signals may also operate the safety valve, if fitted to the cluster, so as to direct treatment fluid from the drain safety position to the injection nozzles. When the shut off valves are actuated treatment fluid fed via the distributor of the clawpiece is injected through the injection nozzles in the heads of the liners of the teat cups at the point of or during removal of the teat cups from the animal. The animal's teats are thereby coated with treatment fluid.

After the milking cluster has been removed from the teats and the teat cups hang downwardly about the clawpiece, their liners may be alternately flushed with water and compressed air injected through the head nozzles in order to remove milk residue, soil and traces of the disinfectant and conditioning fluid from the nozzles and liners. Treatment fluid may be injected into the discharge ends of the liners and/or the short milk tubes via the back flushing nozzles of the shut off valves so as also to rinse and clean the liners. Following this flushing step, there may be a pause in the cleaning cycle to allow time for contact of the treatment fluid with the liners. In the last stage of the cleansing cycle, water and compressed air are alternately injected through the head nozzles and/or the back flush nozzles to rinse away treatment fluid, compressed air being the final fluid to be injected in order to dry the liner and nozzles. Upon completion of the cleansing cycle, the pressure signal applied to each shut off valve and also the safety valve, if fitted, is reversed to a vacuum signal, thereby opening the valves and returning the safety valve to a fail safe position, whereafter the next milking cycle can be commenced.

In order that the present invention may be more readily understood, reference will now be made to the accompanying drawings, in which:—

Figure 1:
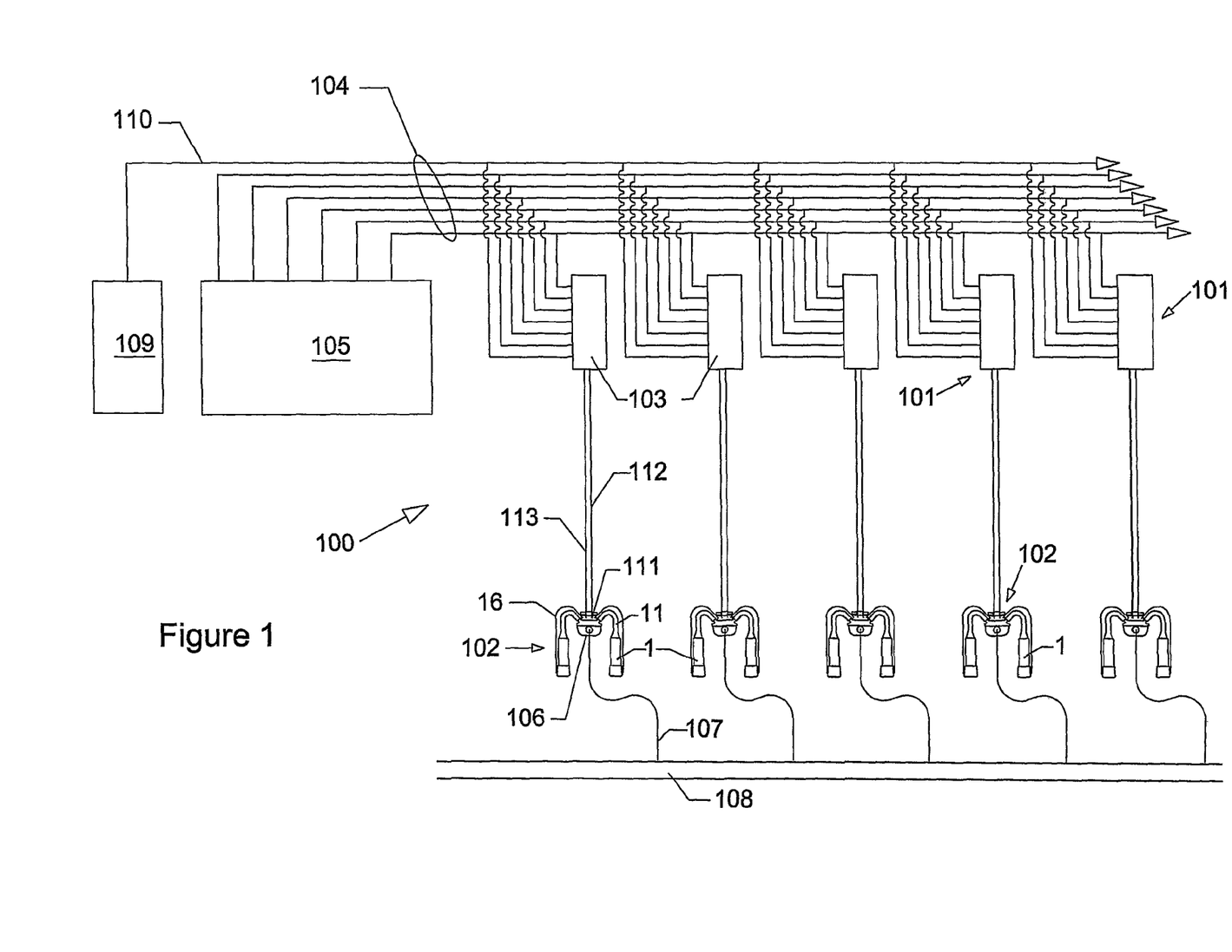
FIG. 1 is a schematic circuit diagram of milking equipment embodying the present invention.

FIG. 1 of the accompanying drawings illustrates milking equipment 100 embodying the invention installed in a milking parlor for cows. The parlor comprises a multiplicity of animal stalls, for example, for cows, in each of which there is a milking point 101 including a milking cluster of four teat cups and a stall control unit 103 incorporating a programmable electronic circuit board controlling solenoid valves which selectively control the delivery of ambient air, high and low pressure compressed air, vacuum pressurised water and pressurised disinfectant products to the milking cluster from a manifold assembly 104 delivering these fluids to the individual milking points 101 from common sources of supply provided by a fluid control unit 105 connected to the manifold assembly. The teat cups 1 of each milking cluster communicate via flexible short milk tubes 11 to the clawpiece 106 of the cluster where the milk extracted from the animal's teats is collected and delivered by a flexible long milk tube 107 to a milk collection line 108 leading to a collection vessel of the equipment. Electrical power for the stall control units 103 is supplied by a common electrical control unit 109 connected to the stall control units via a power cable 110.

Figures 2, 3:
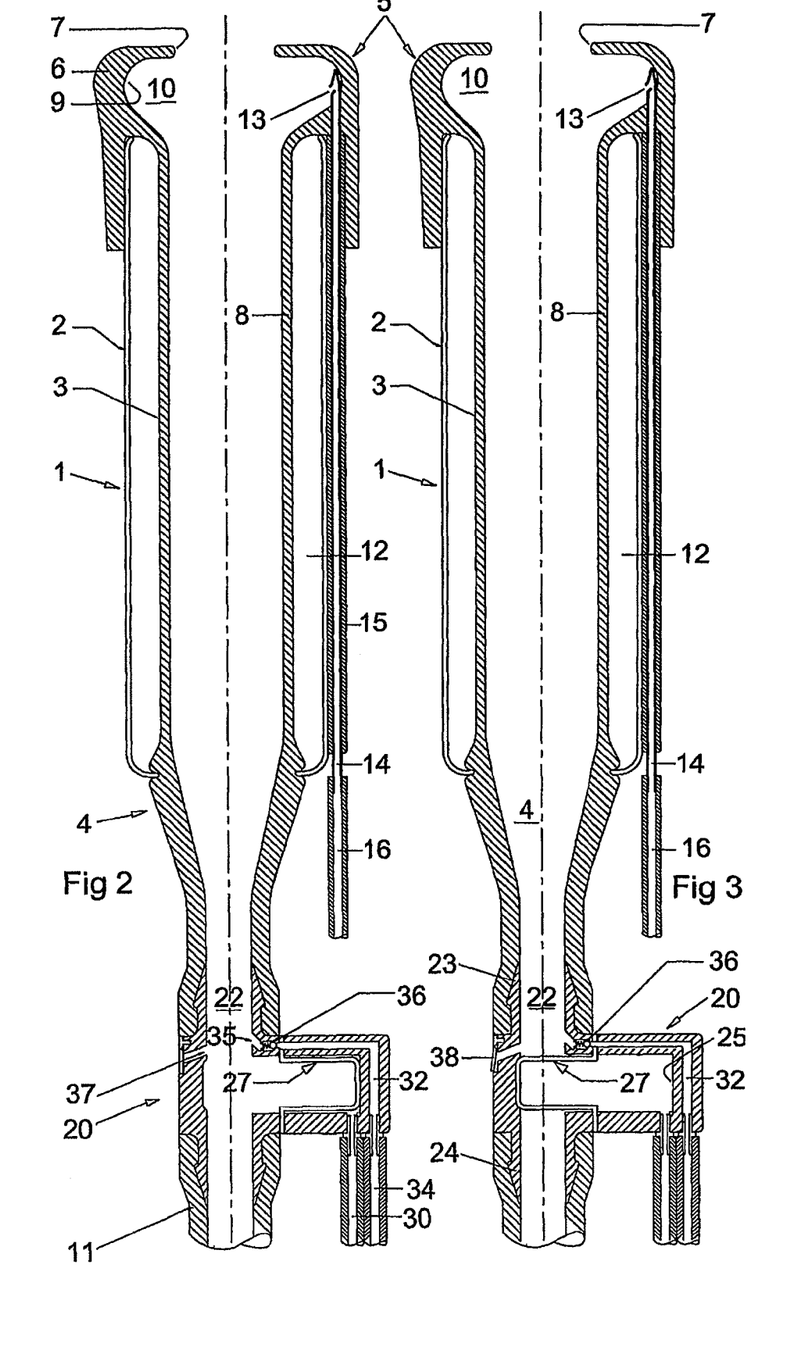
FIG. 2 is an axial section through a teat cup according to the invention, when in the milking position, with the shut-off valve device being shown in an unactuated condition.
FIG. 3 is a view similar to FIG. 1 showing shut-off valve in an actuate condition.
Figure 4:
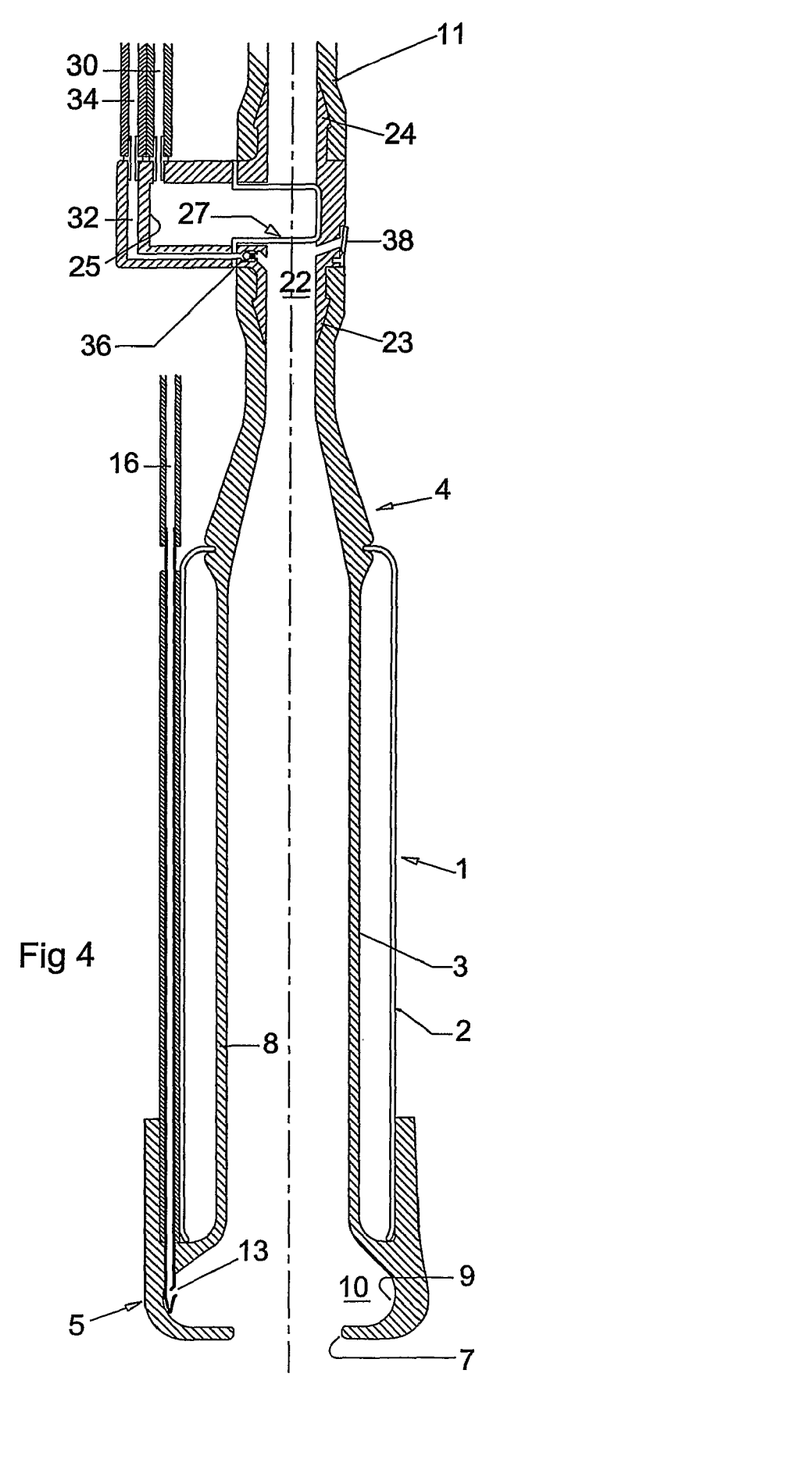
FIG. 4 is a view similar to FIG. 3 showing the teat cup in the inverted position which it is designed to adopt after take off.

Referring to FIGS. 2, 3 and 4, the teat cup 1 of a milking cluster 102 comprises a hollow cylindrical shell 2 supporting a flexible liner 3 in spaced relation with the shell. The liner is sealed to the shell at the bottom, discharge end 4 of the cup and, at the top or head end 5, has a head portion 6 which engages about the outside of the shell in order to seal the head of the liner to the shell. The head of the liner is formed with a mouth 7 permitting access to the interior of the liner. Between the top of the barrel 8 of the liner and the mouth 7, the head of the liner is formed with an internal annular cavity 9 which, when an animal's teat is inserted into the cup through the mouth 7, forms a void or space 10 between the side of the teat and the head. At the discharge end 4 of the cup, the liner communicates with the flexible, short milk tube 11 connecting the teat cup to the clawpiece 106 of the milking cluster and, via which, vacuum is applied to the inside of the liner for removing from the cup, milk discharged by the teat during the milking cycle. By way of example, the shell 2 may be produced from stainless steel or plastics material and the liner 3 may be moulded from resilient plastics, synthetic rubber or silicone.

As will be appreciated by those skilled in the art, the cup 1 is fitted with suitable means (not shown) for connecting the space 12 between the shell 2 and the liner 3, via the clawpiece 106, to apparatus for alternately supplying vacuum pulses and venting the space 12 to atmosphere in order to cause the liner 3 to flex against the teat and stimulate a milking operation. The apparatus for generating and supplying these pneumatic milking pulses is conventional and, since it forms no part of the present invention, it will not be described in detail.

Disposed on the inside of the head 6 of the liner, in the cavity 9, is a port in the form of an injection nozzle 13 which is integral with a tube 14 for delivering fluid to the nozzle. This tube extends down the outside of the shell 2 where it is enclosed in a housing 15 attaching it to the outside of the shell. Its distal or inlet end projects from the housing 15 and is connected to a flexible delivery tube 16. The distal end of the latter is coupled, via a distributor 111 (see FIG. 1) on the clawpiece, to the control valve system of the associated stall control unit 103, as more fully described below, so as to be selectively connectable to atmospheric air and the supplies of disinfectant, water and compressed air.

The injection nozzle 13 is designed so as to direct fluid sprayed from the nozzle inwardly and downwardly into the interior of the barrel 8 of the liner, as viewed in FIGS. 2 and 3.

When the teat cups of a cluster 102 have been fitted to a cow's udder and the milking equipment is being operated in a milking cycle, vacuum is applied through the long milk tube 107 and the clawpiece 106 to each short milk tube 11 in order to extract, from the associated teat cup, milk discharged into the liner from the engaged teat. This vacuum is also applied, via the liner, to the void 10 between the engaged teat and the head 6 of the liner and serves to capture the cup on the teat. Vacuum and atmospheric pressure are then alternately applied in pulses to the space 12 between the liner and the shell in order to flex the liner against the teat and stimulate milking. Milk discharged by the teat into the barrel 8 of the liner is extracted from the liner through the milk discharge passageway 4a at its discharge end 4, the milk tube 11, clawpiece 106 and the long milk tube 107 for delivery to the collecting vessel of the milking equipment. During this milking cycle, clean filtered air at atmospheric pressure is admissible into the heads of the liners of a cluster, via the distributor the delivery tubes 16 and the injection nozzles 13, under the control of a vacuum control valve, as more fully described below, in order to regulate the degree of vacuum downstream of the vacuum control valve. The latter is actuated in response to excessive vacuum in the delivery tubes 16 interconnected by the distributor 111 of the clawpiece and caused by excess vacuum occurring in one or more of the voids 10 in the heads of the teat cup liners. This, in turn, regulates the vacuum in the voids 10 and avoids the occurrence of excessive vacuum which risks the liner creeping up a teat with resultant discomfort to the animal.

The discharge end 4 of each teat cup liner is coupled to the associated short milk tube 11 by a shut off valve device 20 as described in my international application No PCT/GB2005/000310. This device comprises a valve body 21 having a milk passageway 22 therethrough, opposite ends of which terminate in spigots 23,24 connecting the milk passageway to the discharge end 4 of the teat cup liner and the short milk tube, respectively. The valve body 21 has a cylindrical valve chamber 25 to one side of the milk passageway 22 which is connected to the latter via a circular opening 26. A valve member 27 moulded from flexible membrane material, such as, rubber, silicone or other elastomeric material, forms a seal between the chamber 25 and the opening 26. The membrane valve member 27 is moulded in a cylindrical cap-like shape having its cap portion 27a projecting into the chamber 25 and the cavity in the cap portion facing the milk passageway 22, when in the unactuated position shown in FIG. 2. This valve member is retained in position by an outwardly projecting radial flange 28 about the mouth of its cavity trapped between mating parts of the valve body. The valve chamber 25 is selectively connectable to a source of pneumatic pressure or vacuum for controlling the valve member 27 via a port 29 in the wall of the chamber which has its external end connected to a flexible pneumatic tube 30 coupling the port to the source of pneumatic pressure or vacuum. A recess 31 is formed about the internal wall of the milk passageway 22 adjacent the valve chamber 25 for locating the valve member 27 when the latter is extended across the passageway in its actuated position.

Formed in the valve body is a treatment fluid passageway 32 having its inlet end 33 connected to a treatment fluid supply tube 34 and its discharge end connected to a back flush nozzle 35. The back flush nozzle is inclined to the axis of the milk passageway so as to direct flushing or rinsing fluid towards the interior of the liner 3 and is connected to the passageway 22 via a pressure-actuated valve 36.

Formed through the wall of the valve body 21 opposite the back flush nozzle 35 and immediately upstream of the location recess 31 is a drain port 37 for enabling fluid trapped by the shut-off valve to drain from the valve. This port is controlled by a non-return flap valve 38 mounted on the valve body at the external end of the drain port 37.

The spigot 23 at the inlet end of the milk passageway 22 is an interference fit in the discharge end 4 of the flexible liner 3 of the teat cup 1 in order to couple the valve device to the teat cup.

Treatment fluids for sanitising, rinsing and drying, such as disinfecting and conditioning liquid, water and compressed air, as well as compressed air and vacuum for providing pneumatic control signals, are supplied to each stall control unit 103 by the manifold system 104. Each stall control unit incorporates solenoid operated valves which selectively supply the fluids from the manifold system to the associated milking cluster 102 and via the distributor 111 mounted on the clawpiece 106 and flexible tubing 16,34 to the teat cups and shut-off valves.

Figure 5:
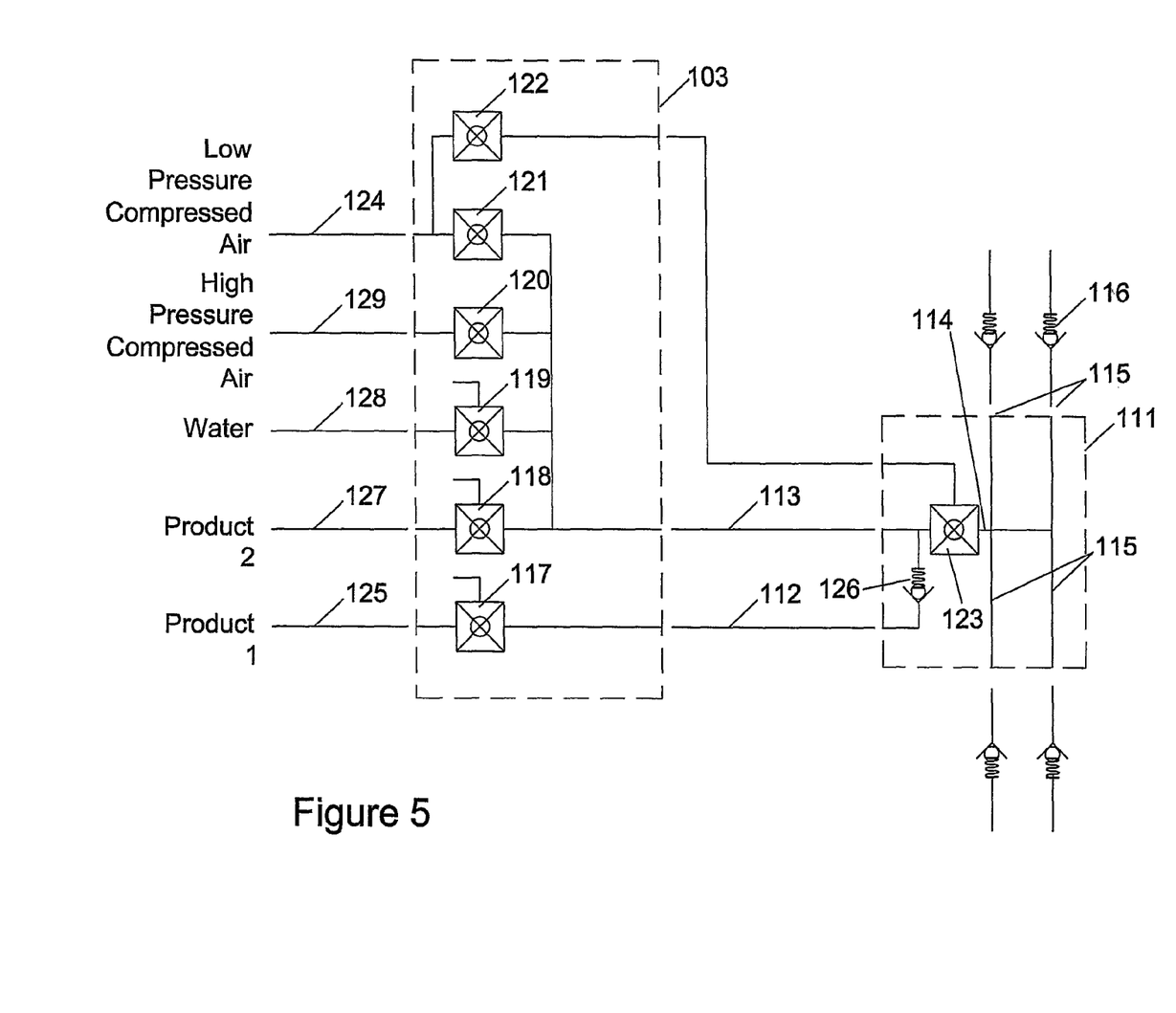
FIG. 5 is a schematic fluid circuit diagram illustrating a valve control system according to the invention which is installed at a milking point and controls the delivery of treatment fluids to the teat cups and the safety valve of a milking cluster.

FIG. 5 illustrates one embodiment of a valve controlled fluid system for regulating the supply of fluids to the distributor and teat cups 1 of a milking cluster 106 embodying the invention.

In FIG. 5, the stall control unit 103 of a milking point 101 and the distributor 111 mounted on the clawpiece 106 of the associated milking cluster are indicated by the broken lines. Each stall control unit 103 has two fluid delivery lines 112, 113 (see also FIG. 1) connected to the inlet 114 of the distributor. The delivery line 112 supplies disinfectant and conditioning liquid, for example, iodine and emollient, for sanitising the teat of a cow, whilst the delivery line 113 supplies disinfectant or rinsing liquid for the teat cups, water and high and low pressure compressed air. Disinfectant, rinse liquid and compressed air supplied to the inlet 114 of the distributor by the delivery lines 112,113 are distributed to the outlets 115 of the distributor which are connected to the delivery tubes 16 and the nozzles 13 of the four teat cups via spring controlled non-return valves which isolate the nozzles of the teat cups from one another and avoid the presence of excessive vacuum one of the teat cups being cross coupled to the other teat cups and disrupting the milking cycle.

The selective control of the supply of fluids to the delivery lines 112,113 is by means of six solenoid operated valves 117-122 actuated under the control of a programmable electronic circuit board of the associated stall control unit 103 and a safety valve 123. Low pressure compressed air, for example, at one bar, for actuating the safety valve 123 is controlled by the valve 122 having an inlet port connected to the low pressure compressed air line 124 of the manifold 104 and an outlet port connected to the safety valve 123. The supply of low pressure air to the delivery line 113 is controlled by the valve 121 having an inlet port connected to the line 124 and an outlet port connected to that delivery line. The supply of disinfectant to the delivery line 112 is controlled by the three-way valve 117 which has an inlet port connected to a disinfectant supply line 125 in the manifold and an outlet port connected, via a spring controlled non-return valve 126 and the safety valve 123 to the inlet of the distributor. A second port serves as a bleed port. The valve 118 controls the supply of a second disinfectant or rinse liquid to the delivery line 113. It has an inlet port connected to the liquid supply line 127 of the manifold and an outlet port connected to the delivery line 113. A second valve ports serves as a bleed port. The control of water, and compressed air at high pressure, for example, 60 bar, to the delivery line 113 is by means of the valves 119,120 respectively, which have inlet ports connected to the water and compressed air manifold supplies 128,129 and both of which have outlet ports connected to the delivery line 113. The second outlet port of the three-way valve 119 serves as a bleed port.

In the fluid control system illustrated in FIG. 5, the delivery line 112 for disinfectant is maintained primed up to the inlet of the pressure actuated non-return valve 126 and, because of this, the safety valve 123 is inserted in this delivery line downstream of the non-return valve and between the latter and the inlet 114 of the distributor. This safety valve is pneumatically operated under the control of the valve 122. During the milking cycle, the safety valve 123 opens a drain port through which the disinfectant and rinse fluids may flow to waste should there be a malfunction in the system upstream of the safety Valve.

Figure 7:
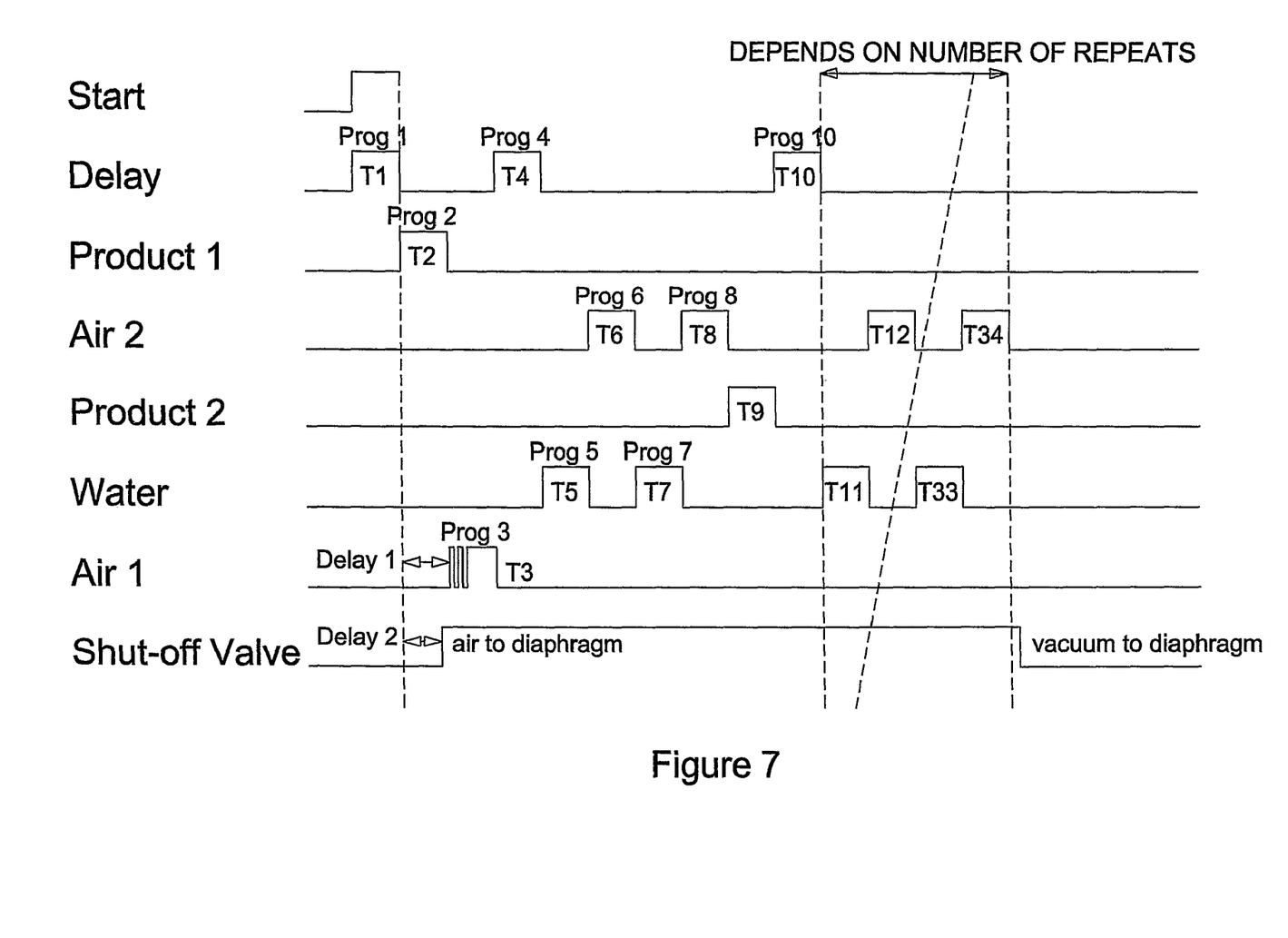
FIG. 7 is a timing chart illustrating an example of the sequence and time periods for the supply of disinfecting and flushing fluids to the teat cups during the cleansing cycle of a milking cluster.

When a milking cluster 102 is attached to the teats of a cow for milking, to the teat cups are in the position generally illustrated in FIGS. 2 and 3 with their heads 6 uppermost. Milking is stimulated conventionally by applying pneumatic pulses to the space 12 between the shell 2 and the liner 3 of each teat cup, via the clawpiece 106, the pulses being alternately applied to pairs of the teat cups. During the milking cycle, the shut-off valves 20 are in the open position, as illustrated in FIG. 7, and the safety valve 123 is in the closed position. Milk is extracted from each teat cup, via its short milk tube 11, by vacuum applied through the clawpiece. This vacuum retains the non-return flap valves 38 in the closed condition so that milk cannot bleed through the drain port 37. The shut-off valves 20 are retained in the open position and the safety valve 62 is retained in the closed position.

When the milking cycle is to be terminated, which is detected by a milk flow meter of the stall control unit as a reduction of milk flow below a predetermined level, the automatic cluster remover is signaled to take off the cluster 102 from the cows udder and, also, the programmable electronic circuit board of the stall control unit 103 is signaled to commence a cleansing cycle. Referring also to the timing chart of FIG. 7, following a preselected time delay T1 at the start of the cleansing cycle to permit vacuum within the liners of the teat cups to decay, the valves 117 and 122 are actuated, just before take off, to open the safety valve 123 and supply a pulse of disinfecting liquid to the distributor inlet 114 for a period T2 at a pressure predetermined by the spring actuated non-return valve 126. Because the delivery line 112 is primed with disinfectant up to the valve 126, the disinfectant is supplied to the distributor inlet 114 and distributed to the injection nozzles 13 of the teat cup heads with minimum delay so as to inject disinfectant into the void 10 about each teat. The injection of this fluid is timed to occur upon or immediately prior to actuation of the cluster remover. It may be aided by delivering pulses and/or a charge T3 of low pressure compressed air, via valve 21, to the injection nozzles 13 and into the void 10 in each cup, as the cups are being removed. This may also assist in removal. In any event, as the cups are removed, the disinfectant is sprayed, spread or wiped down the outside of each teat, thus ensuring that the'whole teat to is hygienically coated with disinfecting liquid. Because the liquid is injected at low pressure and because it is contained within the voids 10 as the cups are removed from the teats, this alleviates the problem of fluid vapor or mist in the surrounding environment and consequent health risks.

Upon closing of the valve 117 at the end of the period T2, which occurs, prior to full take off, compressed air is supplied to the shut-off valves 20 to actuate or extend the membrane valve members 27. This blocks the associated milk passageway and shuts-off fluid flow therethrough for the full cleansing cycle.

Following take off, the teat cups 1 naturally fall into a position in which they hang downwardly from the short milk tubes 11 and in an inverted position with their heads downwardly, as illustrated in FIG. 4. When the teat cups fall into this downwardly hanging position, pulses of water and compressed air are alternately fed to the distributor inlet 114, via the delivery line 113, by alternate actuation of the valves 119,120, as illustrated by time periods T5 to T8 in FIG. 7, and are distributed to the nozzles 13 in order to rinse disinfectant from the nozzles and remove milk residue, soil and traces of the disinfectant from the liners 3. Portions of the water and compressed air may also be distributed to the back flush nozzles 35. Thereafter, the valve 118 opens to supply disinfectant or rinse liquid, via the line 113 and the distributor to the nozzles 13 for a period T9 to disinfect and rinse the liner. Following injection of the rinse liquid, a delay T10 is included in the cycle to enable contact time of the disinfecting rinse liquid with the liners, whereafter the valves 119,120 are alternately opened and closed to provide for the supply of water and compressed air pulses T11-T34 to the nozzles 13 for injection into the liners so as to rinse away the disinfectant. The injection of the water and compressed air pulses at this stage is repeated for a predetermined number of times dependent on rinsing requirements. The last pulse T34 is always a compressed air pulse in order to inject air into the teat cups to dry the liners and injectors. Following the final compressed air pulse, the supply of compressed air is removed from the membrane valve members 27 of the shut-off valves and Vacuum is applied thereto in order to return them into to their respective valve chambers and open the shut-off valves 20 in readiness for the next milking cycle.

Because vacuum is no longer applied to the milk passageways 22 to withdraw milk from the teat cups when the milking cycle is terminated, the pressure in the milk passageways above the extended membrane valve members 27 returns to atmospheric pressure and the flap valves 38 are free to open. This provides the facility for any fluid to drain away if a teat cup, for some reason, becomes entangled and is prevented from falling over upon take off and is held in a partially upright position.

Figure 6:
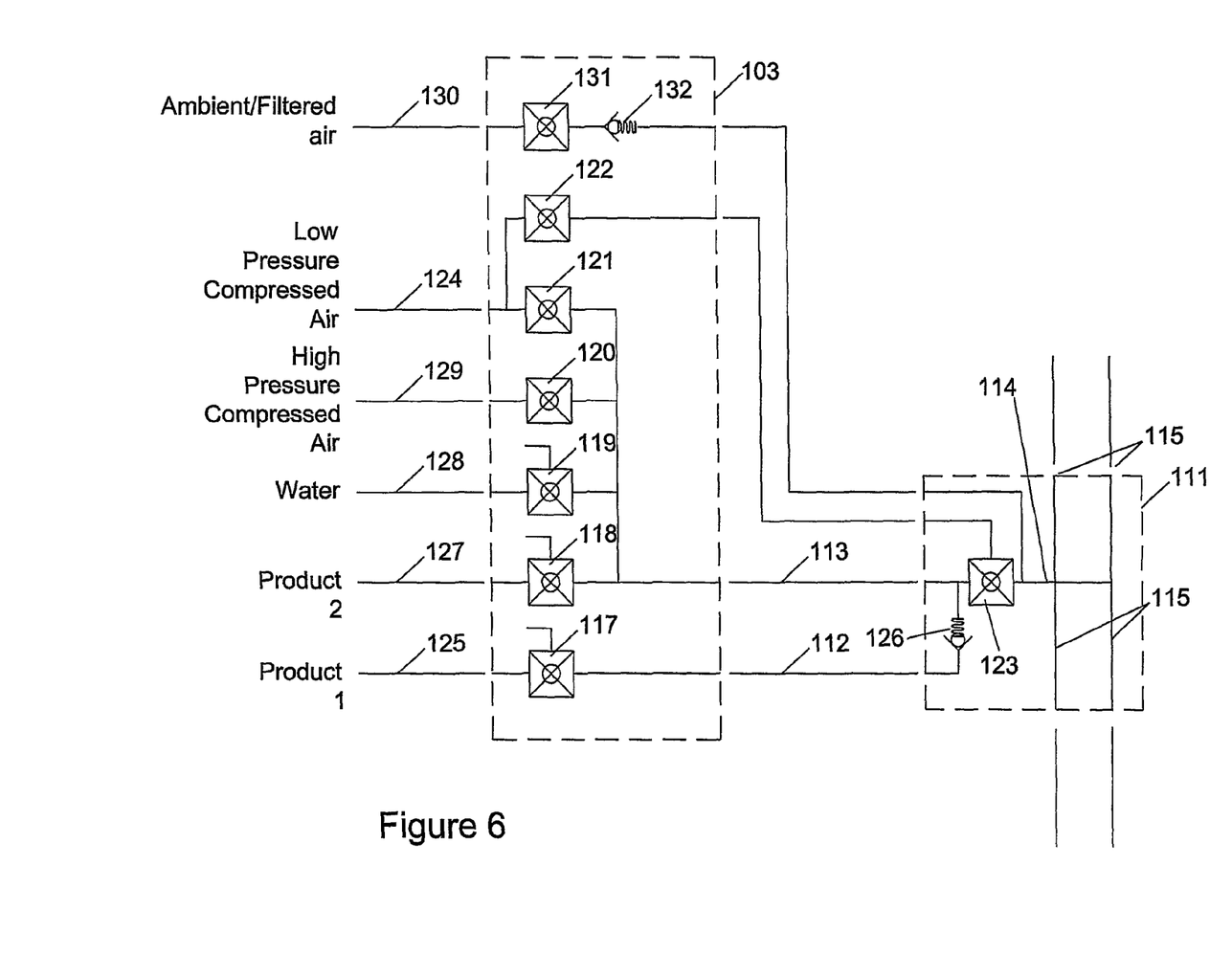
FIG. 6 is a schematic fluid circuit diagram similar to FIG. 5 and including a valve for controlling the supply of air at atmospheric pressure to the heads of the liners for regulating the vacuum in the liner heads.

FIG. 6 illustrates the fluid circuit diagram and control valves for a stall control unit 103 which is adapted to control the degree of vacuum applied to the liner heads 6 of a teat cup cluster during the milking cycle. The fluid circuit is similar to that described with reference to FIG. 5 except for the addition of a filtered air supply 130 which is connected, via a solenoid operated valve 131 and a vacuum regulating valve 132, in this case a spring controlled non-return valve, to the inlet 114 of the distributor through which fluid is distributed to the injection nozzles 13 in the liner heads of the teat cup cluster. The filtered air supply is preferably derived from ambient air at atmospheric pressure which is filtered through a food grade filtration unit to reduce the risk of contaminating the milk. During the milking cycle, this is applied to the inlet port of the valve 132 which is responsive to differential pressure. Its outlet port is subject to the level of the vacuum present at the distributor inlet 114 and, hence, via the distributor, delivery tubes 16 and nozzles 13, to the vacuum in the cavities 10 in the heads of the liners. When excessive vacuum occurs in one or more of these cavities, the resultant differential pressure opens the valve 132 so that air at atmospheric pressure is drawn into the delivery tubes 16 and the cavity or cavities 10 to reduce the vacuum to the desired predetermined level, thereby to regulate the vacuum in the liner heads. The benefit of this is that the level of the vacuum is controlled in the area of the heads 6 to prevent the risk of liner creep up the teat which could result in the restriction of blood flow in the animal's teats and consequent discomfort, poor milk let down and physical damage to the teat. The to regulation of the vacuum in the heads of the liners enables precise control over the milking characteristics of the teat cup.

Whilst a particular embodiment has been described, it will be understood that modifications can be made without departing from the scope of the invention. For example, the shut off valve devices 20 may be modified to omit the back-flush nozzles 35, associated valves and delivery tubes; and rinsing and drying may be achieved simply by supplying rinsing fluid and compressed air; via the tubes 14,16, to the nozzles 13. The fact that these nozzles are designed to direct a spray pattern into the barrels of the liners 3 will facilitate rinsing and drying by this means.

The invention claimed is:

1. A milking unit for connecting teats of an animal to be milked to a milk collection vessel, comprising:
   a milking cluster comprising a plurality of teat cups and a clawpiece;
   a flexible long milk tube;
   each of said teat cups comprising a flexible liner for engaging about a teat of an animal to be milked, a head portion at one end of said flexible liner having a mouth through which the teat is engageable with said flexible liner, and a milk discharge passageway at the opposite end of said flexible liner;
   the clawpiece being coupled by flexible short milk tubes to said milk discharge passageways of said teat cups for collecting milk from said teat cups;
   the flexible long milk tube having a first end coupled with the clawpiece for receiving said milk collected by the clawpiece and an opposite second end through which said milk collected by the clawpiece is delivered for onward delivery to the milk collection vessel;
   post milking flushing means adapted to apply treatment fluid to said teats as said teat cups are withdrawn from said teats upon termination of milking and to direct treatment fluid into barrels of said flexible liners when the teat cups are allowed to fall into inverted position, with the head portions of the teat cups directed downwardly, after withdrawal of the teat cups from the teats, said post milking flushing means comprising nozzles arranged to discharge said treatment fluid into said head portions of said flexible liners of said teat cups, in a direction away from said mouths of said flexible liners;
   a distributor mounted on said clawpiece for distributing treatment fluid to said nozzles and comprising a distributor inlet for treatment fluid and distributor outlets;
   a plurality of delivery tubes connecting said distributor outlets to said nozzles;
   first and second delivery lines for treatment fluid connected to said distributor inlet;
   a first valve mounted on said clawpiece and located in or in close proximity to said distributor, said first valve connecting said first delivery line to said distributor inlet, said first valve operating to maintain said first delivery line primed with treatment fluid up to said first valve;
   said second delivery line being connected to said distributor inlet downstream of said first valve; and
   valve control means operable to supply treatment fluid to said first delivery line for causing said first valve to open and feed treatment fluid from the primed first delivery line to said distributor inlet as said teat cups are withdrawn;
   said valve control means being operable to supply treatment fluid to said second delivery line when the teat cups fall into said inverted position with said head portions thereof directed downwardly after withdrawal of said teat cups from the teats.

2. A milking unit as claimed in claim 1, in which said first valve for connecting said distributor inlet to said first delivery line is a pressure actuated non-return valve.

3. A milking unit as claimed in claim 1, including a safety valve connected between said first valve and said distributor inlet and said second delivery line and said distributor inlet to prevent treatment fluid entering said distributor inlet and contaminating the milk in the event of a malfunction.

4. A milking unit as claimed in claim 1, including a vacuum regulating valve for connecting said distributor inlet to an air supply, said vacuum regulating valve being operable to admit air to said distributor in order to regulate the level of vacuum present within one or more of said liners during a milking operation.

5. A milking unit as claimed in claim 4, in which said vacuum regulating valve is adapted to open in response to said vacuum exceeding a predetermined difference with respect to said air supply in order to regulate the level of said vacuum.

6. A milking unit as claimed in claim 4, in which said vacuum regulating valve is a spring controlled non-return valve which has an inlet connectable to said air supply and an outlet connected to said distributor inlet and which is adapted to open in response to the differential pressure between said inlet and said outlet of the non-return valve exceeding a predetermined amount.

7. A milking unit as claimed in claim 4, in which said vacuum regulating valve is adjustable so that said vacuum can be regulated to specific levels by the use of said vacuum regulating valve.

8. A milking unit as claimed in claim 4, in which said air supply connectable to said vacuum regulating valve is clean filtered air to reduce the risk of contamination.

9. A milking unit as claimed claim 4, in which said air supply is ambient air at atmospheric pressure.

10. A method of milking comprising the steps of:
providing a milking unit for connecting teats of an animal to be milked to a milk collection vessel, said milking unit comprising a milking cluster that includes a plurality of teat cups and a clawpiece, said milking unit further comprising a flexible long milk tube having a first end coupled with the clawpiece for receiving milk collected by the clawpiece and an opposite second end through which said milk collected by the clawpiece is delivered for onward delivery to the milk collection vessel;
applying said teat cups of said milking cluster to said teats of the animal to be milked, each of said teat cups comprising a flexible liner engaging about the respective teat, a head portion at one end of said flexible liner having a mouth through which the respective teat is engaged with said liner, and a milk discharge passageway at the opposite end thereof coupled to the clawpiece;
activating said flexible liners of said teat cups to perform a milking operation; and, when the milking operation is terminated, discharging treatment fluid into said head portions of said liners and withdrawing said teat cups from said teats, said discharging and withdrawing steps comprising:
supplying said treatment fluid to said head portions via a delivery line connected to an inlet of a distributor mounted on said clawpiece of said milking cluster for distributing treatment fluid to said head portions,
maintaining said delivery line primed with treatment fluid up to a first valve that is mounted on said clawpiece and is located in or in close proximity to said distributor, preparatory to discharge of said treatment fluid into said head portions,
causing said first valve to open and feed treatment fluid from the primed delivery line into said distributor inlet,
said first valve being caused to open to discharge treatment fluid fed through said distributor into said head portions of said liners and onto the respective teats as said teat cups are withdrawn,
utilising withdrawal of said teat cups to wipe said treatment fluid down the respective teats,
allowing the teat cups to fall into an inverted position with the head portions directed downwardly after withdrawal of the teat cups from the teats,
supplying treatment fluid to a second delivery line connected to the distributor inlet, and
discharging the treatment fluid fed through the second delivery line and distributor into the head portions of the liners inwardly into the interiors of the liners and in a direction away from the mouths of the liners.

11. A method of milking as claimed in claim 10, further comprising the steps of applying vacuum to said milk discharge passageways to extract milk from said teat cups and capture said teat cups on the respective teats, and admitting air to said head portion of at least one of said liners upon sensing vacuum in said head portion to exceed a predetermined level, thereby regulating said vacuum present within said head portion of said at least one liner.

12. A method as claimed in claim 11, in which the step of admitting air comprises supplying ambient air at atmospheric pressure.

13. A method as claimed in claim 12, in which the step of admitting air is initiated in response to the differential pressure between said vacuum and the atmospheric pressure exceeding a predetermined amount.

\* \* \* \* \*

UNITED STATES PATENT AND TRADEMARK OFFICE
CERTIFICATE OF CORRECTION

PATENT NO.        : 8,240,272 B2  
APPLICATION NO.   : 11/568171  
DATED             : August 14, 2012  
INVENTOR(S)       : Duke It is certified that error appears in the above-identified patent and that said Letters Patent is hereby corrected as shown below:

Title page,  
Insert the following:  
　　--Related U.S. Application Data  
(60) Provisional application No. 60/566,313, filed on Apr. 29, 2004--.

Drawings,  
Sheet 2 should be deleted to be substituted with the attached sheet 2.

Specification,  
Column 9,  
Line 11, "valves which" should read --valves 116 which--;  
Line 36, "valve ports serves" should read --valve port serves--.

Column 10,  
Line 24, "valve 21" should read --valve 121--.

Signed and Sealed this  
Ninth Day of April, 2013

Teresa Stanek Rea  
*Acting Director of the United States Patent and Trademark Office*